3,297,674
MODIFYING POLYMERS
David S. Breslow and Arnold F. Marcantonio, Wilmington, Del., assignors to Hercules Incorporated, a corporation of Delaware
No Drawing. Filed Apr. 1, 1964, Ser. No. 356,630
The portion of the term of the patent subsequent to Sept. 7, 1982, has been disclaimed
8 Claims. (Cl. 260—93.7)

This application is a continuation-in-part of copending applications Serial No. 230,699, filed October 15, 1962, and Serial No. 209,228, filed July 11, 1962, the latter of which is now abandoned.

This invention relates to modifying higher α-olefin polymers and to the products so produced. More particularly, the invention relates to modifying higher α-olefin polymers with certain aromatic polyazides and to the products so produced. By the term "higher α-olefin polymer" is meant a polymer of an α-olefin containing 3 or more carbon atoms.

In the past, industry has depended almost entirely upon sulfur or sulfur-bearing materials as vulcanizing, i.e., cross-linking agents. It has more recently been discovered that certain types of organic peroxides or azo compounds are capable of acting as vulcanizing agents. However, all of the above agents suffer the drawback that, because of their mode of action, they are not equally effective in cross-linking all types of polymers. For example, polypropylene cannot be effectively vulcanized with peroxides and sulfur alone has no effect on higher α-olefin polymers.

Now, in accordance with this invention, it has unexpectedly been found that higher α-olefin polymers can be cross-linked with certain aromatic polyazides to produce vulcanizates that are tough, resilient, solvent-resistant and odor-free. In addition, higher α-olefin polymers can be treated with smaller amounts of aromatic polyazides to improve their properties without materially affecting their solubility.

The aromatic polyazides useful in the present invention are m-phenylene diazide, 2,4,6-triazidobenzene, 4,4'-diphenyl diazide, 4,4'-diphenylmethane diazide, 4,4'-diazidodiphenylsulfone, 2,2'-dinitro-4,4'-diazidodiphenyl, 2,7-diazidonaphthalene and 2,6-diazidoanthraquinone. The above aromatic polyazides are advantageous to use because of their relative insensitivity to impact, scorch resistance and because they have half-lives which can be varied with structural environment.

The aromatic polyazides employed in this invention can be prepared in various ways, as for example, by diazotizing the corresponding aromatic amine and treating it with hydrazoic acid. The reaction can be shown by the following equation.

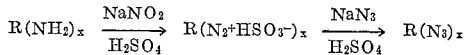

where R is the aromatic grouping and $x$ is 2 or 3. The aromatic amines are well-known materials whose preparation is described in the chemical literature.

Any higher α-olefin polymer, including linear, atactic, crystalline or nonlinear amorphous polymers, as for example, polypropylene, polyisobutylene, etc., can be modified with any of the aromatic polyazides enumerated above.

The modification is carried out by heating the α-olefin polymer plus the aromatic polyazide above its decomposition temperature. This temperature can be varied over a wide range but generally will fall within the range of from about 90° C. to about 300° C. Various amounts of polyazide can be added, the optimum amount depending upon the amount of cross-linking or other modification desired, the specific aromatic polyazide employed, etc. In general, the amount added, based on the weight of the polymer, will be from about 0.001% to about 30%.

The aromatic polyazide can be incorporated in the polymer in a number of ways. For example, it can be uniformly blended by simply milling on a conventional rubber mill or dissolved in a solution containing the polymer. By either means, it is distributed throughout the polymer and uniform cross-linking or other modification is effected when the blend is subjected to heat. Other means of mixing the polyazide with the polymer will be apparent to those skilled in the art.

In addition to the aromatic polyazide, other ingredients can also be incorporated. The additives commonly used in rubber vulcanizates can be used here also, as for example, extenders, fillers, pigments, plasticizers, stabilizers, etc. Obviously, there are many cases in which other ingredients are not required or desired and excellent results are achieved when only the polyazide is added.

The following examples are presented to illustrate the process of modifying higher α-olefin polymers in accordance with this invention, parts and percentages being by weight unless otherwise specified. In the examples, the extent of cross-linking is determined by analysis for percent gain in insolubility in solvents in which the uncross-linked polymer was soluble and for the degree of swell therein, hereinafter termed "percent gel" and "percent swell." Percent gel is indicative of the percentage of polymer that is cross-linked and percent swell is inversely proportional to the cross-link density. Percent gel and swell are determined as follows: A weighed sample of cross-linked polymer is soaked in a solvent in which the uncross-linked polymer was soluble, at an elevated temperature for a specified length of time. The sample is then removed, blotted on filter paper so as to remove the solvent on the surface and weighed at once. The swollen sample is then dried to constant weight. The weights of initial and final sample are corrected for polymer and copolymer content based on knowledge of components. From these figures $$\frac{\text{corrected dry weight}}{\text{corrected initial weight}} \times 100 = \text{percent gel}$$

$$\frac{\text{corrected swollen weight} - \text{corrected dry weight}}{\text{corrected dry weight}}$$

$$\times 100 = \text{percent swell}$$

The molecular weight of the polymers modified in the examples can be indicated by their Reduced Specific Viscosity (RSV). By the term "Reduced Specific Viscosity" is meant the $\eta_{sp.}/c.$ determined on an 0.1% solution (0.1 g. of polymer per 100 ml. of solution) of the polymer at elevated temperature.

*Example 1*

A sample of crystalline polypropylene having an RSV of 3.8 (determined in decahydronaphthalene at a temperature of 135° C.) was blended with 4,4'-diphenylmethane diazide in a ratio of 100 parts of polymer to 2 parts of aromatic diazide as follows. The polymer in the form of flakes was slurried with an ethylene dichloride solution of the diazide. Then the solvent was allowed to evaporate under vacuum at a temperature of 60° C. The dry mixture was further blended manually and then compression molded for 6 minutes at a temperature of 216° C. The vulcanizate had a percent gel of 50.6 and a percent swell of 2450 (as determined in an excess of toluene at 80° C.).

Example 2

A sample of amorphous polypropylene having an RSV of 2.7 (determined in decahydronaphthalene at a temperature of 135° C.) was cross-linked with 2,6-diazidoanthraquinone. To a 3% solution of the polymer in toluene was added 5 parts per hundred parts polymer, of the diazide. The solution was vigorously agitated and the solvent allowed to evaporate overnight. The resulting dry blend was heated in a closed iron mold for 1 hour at a temperature of 175° C. The vulcanizate had a percent gel of 59 and a percent swell of 4090 (as determined in an excess of toluene at 80° C.).

Example 3

A sample of amorphous polypropylene having an RSV of 0.78 (determined in decahydronaphthalene at a temperature of 135° C.) was blended with 5 parts per hundred of 4,4'-diphenyl diazide exactly as described in Example 2. The resulting dry blend was heated in a closed iron mold for 1 hour at a temperature of 165° C. The vulcanizate had a percent gel of 63 and a percent swell of 990 (as determined in an excess of toluene at 80° C.).

Example 4

A sample of amorphous polypropylene having an RSV of 2.1 (determined in decahydronaphthalene at a temperature of 135° C.) was blended with 10 parts per hundred of 4,4'-diazidodiphenylsulfone exactly as described in Example 2. The resulting dry blend was heated in a closed iron mold for 1 hour at a temperature of 165° C. The vulcanizate had a percent gel of 60 and a percent swell of 2130 (as determined in an excess of toluene at 80° C.).

Example 5

A sample of the amorphous polypropylene described in Example 4 was blended with 6.5 parts per hundred of 2,2'-dinitro-4,4'-diazido diphenyl exactly as described in Example 2. The resulting dry blend was heated in a closed iron mold for 1 hour at a temperature of 165° C. The vulcanizate had a percent gel of 28 and a percent swell of 4470 (as determined in an excess of toluene at 80° C.).

Examples 6–8

Three samples of the amorphous polypropylene described in Example 4 were blended with 5 parts per hundred of different aryl azides exactly as described in Example 2. In each case the resulting dry blend was heated in a closed iron mold for 1 hour at a temperature of 165° C. The aryl azide used and the percent gel and swell of each sample as determined in an excess of toluene at 80° C. is tabulated below.

| Aryl Azide | Percent Gel | Percent Swell |
|---|---|---|
| m-Phenylenediazide | 63 | 3,050 |
| 2,4,6-triazidobenzene | 68 | 2,525 |
| 2,7-diazidonaphthalene | 61 | 3,420 |

Example 9

To 2.06 parts of polyisobutylene (having a molecular weight of approximately 70,000), dissolved in 68 parts of n-heptane, was added 0.16 part of 4,4'-diphenylmethane diazide. The heptane solvent was allowed to evaporate overnight and the blend was then cured in a closed iron mold for one hour at a temperature of 160° C. The vulcanizate had a percent gel of 30 (as determined in an excess of toluene at 80° C.).

What we claim and desire to protect by Letters Patent is:

1. The process of modifying a higher α-olefin polymer which comprises heating said polymer with an agent consisting essentially of an aromatic polyazide selected from the group consisting of m-phenylene diazide, 2,4,6-triazidobenzene, 4,4'-diphenyl diazide, 4,4'-diphenylmethane diazide, 4,4' - diazidodiphenylsulfone, 2,2' - dinitro-4,4'-diazidodiphenyl, 2,7-diazidonaphthalene and 2,6-diazidoanthraquinone.

2. The process of claim 1 wherein the aromatic polyazide is 4,4'-diphenylmethane diazide.

3. The process of claim 1 wherein the aromatic polyazide is 4,4'-diphenyl diazide.

4. The process of claim 1 wherein the higher α-olefin polymer is polypropylene.

5. The process of claim 1 wherein the higher α-olefin polymer is polyisobutylene.

6. A higher α-olefin polymer modified with an aromatic polyazide selected from the group consisting of m-phenylene diazide, 2,4,6-triazidobenzene, 4,4'-diphenyl diazide, 4,4'-diphenylmethane diazide, 4,4-diazidodiphenylsulfone, 2,2'-dinitro-4,4'-diazidodiphenyl, 2,7-diazidonaphthalene and 2,6-diazidoanthraquinone.

7. The product of claim 6 wherein the higher α-olefin polymer is polypropylene.

8. The product of claim 6, wherein the higher α-olefin polymer is polyisobutylene.

References Cited by the Examiner
UNITED STATES PATENTS 3,205,206   9/1965   Marcantonio _____ 260—94.9

JOSEPH L. SCHOFER, *Primary Examiner.*

JAMES A. SEIDLECK, *Examiner.*

L. EDELMAN, *Assistant Examiner.*